(12) United States Patent
Jin

(10) Patent No.: US 10,627,941 B2
(45) Date of Patent: *Apr. 21, 2020

(54) INTEGRATED TOUCH CONTROL DISPLAY PANEL AND TOUCH DISPLAY DEVICE COMPRISING CONDUCTIVE LAYER IN NON-DISPLAY REGION

(71) Applicants: SHANGHAI AVIC OPTOELECTRONICS CO., LTD., Shanghai (CN); TIANMA MICRO-ELECTRONICS CO., LTD., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/116,052

(22) Filed: Aug. 29, 2018

(65) Prior Publication Data

US 2018/0364849 A1    Dec. 20, 2018

Related U.S. Application Data

(63) Continuation of application No. 15/155,130, filed on May 16, 2016, now Pat. No. 10,095,336.

(30) Foreign Application Priority Data

Dec. 7, 2015  (CN) .......................... 2015 1 0895886

(51) Int. Cl.
*G06F 3/044*    (2006.01)
*G06F 3/047*    (2006.01)
(Continued)

(52) U.S. Cl.
CPC .............. *G06F 3/0412* (2013.01); *G02F 1/13* (2013.01); *G02F 1/13338* (2013.01);
(Continued)

(58) Field of Classification Search
CPC .......... G06F 3/047; G06F 3/041; G06F 3/044; G06F 3/0416; G06F 3/0412; G02F 1/13; G02F 1/13338
See application file for complete search history.

(56) References Cited

U.S. PATENT DOCUMENTS

| 10,095,336 B2 * | 10/2018 | Jin .................... G02F 1/13338 |
| 2013/0321296 A1 * | 12/2013 | Lee .................... G09G 3/3674 |
| | | 345/173 |
| 2013/0342770 A1 * | 12/2013 | Kim ...................... G06F 3/044 |
| | | 349/12 |
| 2014/0146246 A1 | 5/2014 | Ma et al. |

(Continued)

FOREIGN PATENT DOCUMENTS

| CN | 1512251 A | 7/2004 |
| CN | 102662264 A | 9/2012 |

(Continued)

*Primary Examiner* — Jennifer Mehmood
*Assistant Examiner* — James S Nokham
(74) *Attorney, Agent, or Firm* — Anova Law Group PLLC

(57) ABSTRACT

The present disclosure provides an integrated touch control display panel, including a first substrate, a plurality of data lines supplying display signals to display pixels, a plurality of touch control signal lines carrying touch control signals for touch control electrodes, a plurality of first lead lines for the data lines configured outside a display region, a plurality of second lead lines for the touch control signal lines configured outside the display region, and a conductive layer configured adjacent to the second lead lines. In a direction perpendicular to the first substrate, the first lead lines overlap with the second lead lines in an overlapping region. The second lead lines are configured on the side of the first lead lines facing away from the first substrate. The conductive (Continued)

layer is insulated from the first lead lines, and is electrically connected to the second lead lines.

18 Claims, 9 Drawing Sheets

(51) Int. Cl.
  *G02F 1/13* (2006.01)
  *G06F 3/041* (2006.01)
  *G02F 1/1333* (2006.01)
  *G09G 3/36* (2006.01)

(52) U.S. Cl.
  CPC .............. *G06F 3/044* (2013.01); *G06F 3/047* (2013.01); *G06F 3/0416* (2013.01); *G09G 3/3648* (2013.01); *G09G 2300/0426* (2013.01); *G09G 2354/00* (2013.01)

(56) References Cited

U.S. PATENT DOCUMENTS

| 2014/0204284 | A1 | 7/2014 | Yao et al. |
| 2014/0240279 | A1* | 8/2014 | Hwang ................. G06F 3/0412 |
| | | | 345/174 |
| 2015/0309630 | A1 | 10/2015 | Yang et al. |
| 2016/0187695 | A1 | 6/2016 | Cho et al. |
| 2017/0003792 | A1 | 1/2017 | Berget et al. |

FOREIGN PATENT DOCUMENTS

| CN | 104461113 A | 3/2015 |
| CN | 104793828 A | 7/2015 |
| CN | 104865756 A | 8/2015 |
| CN | 104965622 A | 10/2015 |
| CN | 104977766 A | 10/2015 |
| CN | 204790958 U | 11/2015 |
| CN | 205281443 U | 6/2016 |

* cited by examiner

INTEGRATED TOUCH CONTROL DISPLAY PANEL AND TOUCH DISPLAY DEVICE COMPRISING CONDUCTIVE LAYER IN NON-DISPLAY REGION

CROSS-REFERENCES TO RELATED APPLICATIONS

This application is a continuation application of U.S. Ser. No. 15/155,130, filed on May 16, 2016, which claims the priority of Chinese Patent Application No. CN201510895886.5, filed on Dec. 7, 2015, the entire contents of which are incorporated herein by reference.

FIELD OF THE DISCLOSURE

The present disclosure generally relates to the touch control technologies and, more particularly, relates to an integrated touch control display panel and a touch display device.

BACKGROUND

With the advancement of modern electronic technologies, the display panel of display device may incorporate additional structures to support more functions. For example, touch control structure may be incorporated to support touch control function to provide users with application convenience.

Currently, to reduce the thickness of display panel and support touch control function at the same time, touch control structure is often integrated into display panel. When the capacitive touch control structure is used, the touch control electrodes of the capacitive touch control structure may be directly formed on the same substrate as the display structure. However, such configuration may cause certain issues. The peripheral region that surrounds the display region on the substrate may be configured with circuits and wirings for the display structure. In addition, the driver circuits and wirings for the touch control structure may also be configured in the same peripheral region. Thus, the circuit and wiring configuration in the peripheral region may become a challenge and may jeopardize display product reliability.

The disclosed integrated touch control display panel and touch display device are directed to solve one or more problems in the art.

BRIEF SUMMARY OF THE DISCLOSURE

Directed to solve one or more problems set forth above and other problems in the art, the present disclosure provides an integrated touch control display panel and a touch display device.

One aspect of the present disclosure includes an integrated touch control display panel. The integrated touch control display panel includes a first substrate, a plurality of data lines configured on the first substrate supplying display signals to display pixels, a plurality of touch control signal lines configured on the first substrate carrying touch control signals for touch control electrodes, a plurality of first lead lines for the data lines configured outside a display region on the first substrate, a plurality of second lead lines for the touch control signal lines configured outside the display region on the first substrate, and a conductive layer configured adjacent to the second lead lines. In a direction perpendicular to the first substrate, the first lead lines overlap with the second lead lines in an overlapping region. The second lead lines are configured on the side of the first lead lines facing away from the first substrate. The conductive layer is insulated from the first lead lines, and is electrically connected to the second lead lines.

Another aspect of the present disclosure includes a touch display device. The touch display device includes the disclosed integrated touch control display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
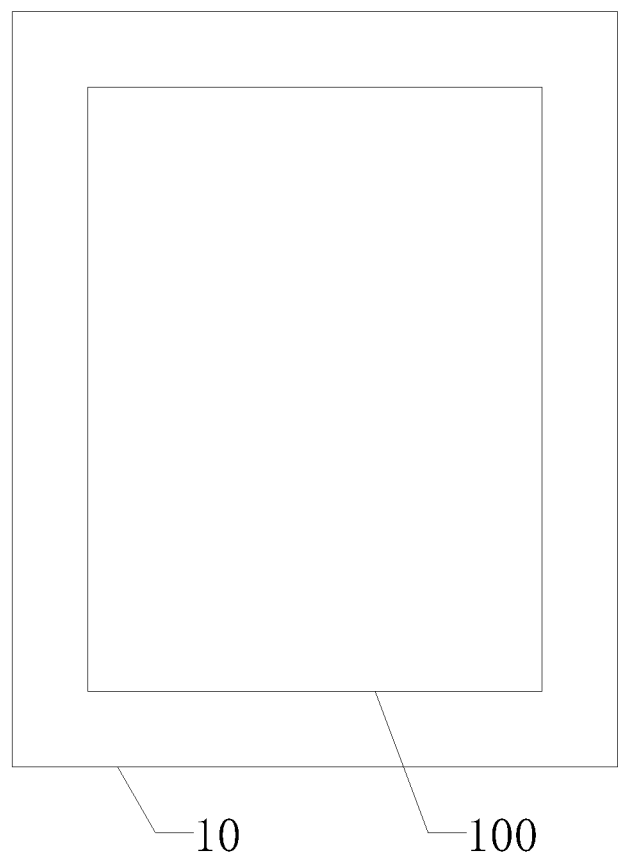
FIG. 1 illustrates a schematic view of an exemplary touch display device according to the disclosed embodiments.

FIG. 1 illustrates a schematic view of an exemplary touch display device according to the present disclosure. Referring to FIG. 1, the touch display device 10 may include an integrated touch control display panel 100 and other components to support the operation of the integrated touch control display panel 100. The touch display device may be a smart phone, a desktop computer, a laptop computer, and an electronic photo album, etc. The integrated touch control display panel 100 may include the touch control structure and display structure configured on a same substrate to support both image display and touch control functions.

Such integration may reduce the number of substrates and the thickness of the integrated touch control display panel. As a result, the integrated touch control display panel may not only have the convenient touch control function, but also have the advantages of compact dimension and light weight. On the other hand, the integration of the touch control structure and the display structure on the same substrate may bring other issues and obstacles, such as wiring damages in peripheral areas. For the touch display device according to the present disclosure, improvements have been made to the integrated touch control panel 100 to increase the reliability.

Figure 2:
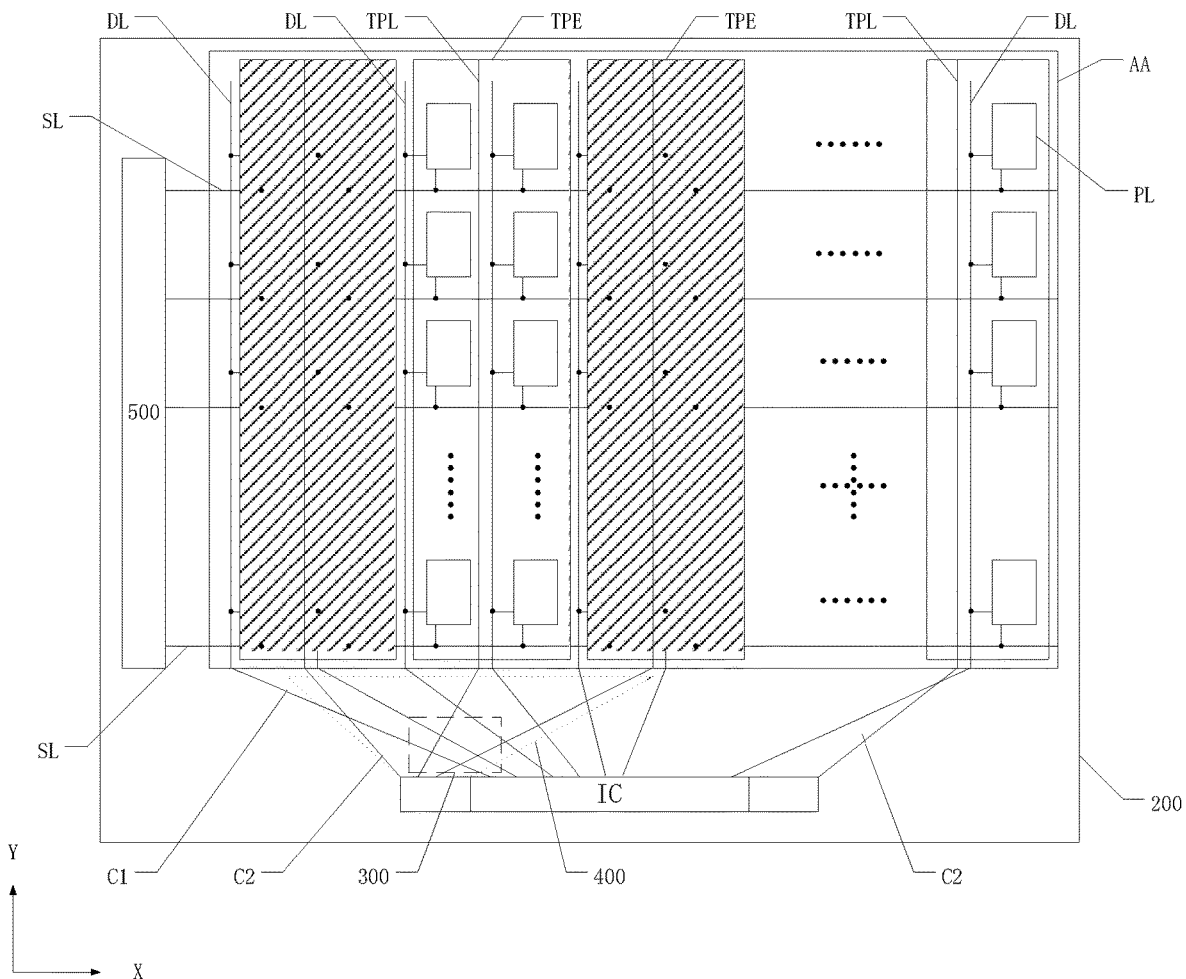
FIG. 2 illustrates a top view of an exemplary integrated touch control display panel according to the disclosed embodiments.

FIG. 2 illustrates a top view of an exemplary integrated touch control display panel according to the present disclosure. Referring to FIG. 2, the integrated touch control display panel 100 may include a substrate 200, a plurality of stripe-shaped touch control electrodes TPE, a plurality of display pixels PL, a plurality of data lines DL, and a plurality of touch control signal lines TPL, all of which may be configured on the substrate 200. The plurality of the data lines DL may supply display signals to display pixels PL. The plurality of the touch control signal lines TPL may carry touch control signals of the stripe-shaped touch control electrodes TPE.

Outside the display region AA on the substrate 200, a plurality of first lead lines C1 may be configured to connect the data lines DL to an integrated circuit (IC), and a plurality of second lead lines C2 may be configured to connect the touch control signal lines TPL to the IC. In a direction perpendicular to the substrate 200, the first lead lines C1 and the second lead lines C2 may overlap with one another as highlighted in a region 400 in FIG. 2. The region 400 shown in FIG. 2 may also be called the overlapping region.

The data lines DL may be connected to the IC through the first lead lines C1. The IC may supply display signals to each display pixel PL through the data lines DL. Similarly, the touch control signal lines TPL may be connected to the IC through the second lead lines C2. The IC may supply touch control driving signals to each touch control electrode TPE through the touch control signal lines TPL. The touch control detecting signals collected by the touch control electrodes TPE may be sent to the IC for processing through the touch control signal lines TPL. Both the touch control driving signals and the touch control detecting signals may be called the touch control signals. The touch control signal lines TPL may be configured to carry the touch control signals.

Generally, the connection pins for the touch control signals may be located on one or both ends of the IC. Accordingly, the connection pins for the display signals may be located on the other end or in the middle of the IC. When the touch control signal lines TPL and the data lines DL are connected to the IC, the lead lines of the touch control signal lines TPL and the data lines DL may intersect with one another. Thus, in the direction perpendicular to the substrate 200, the first lead lines C1 and the second lead lines C2 may overlap in the overlapping region 400.

Figure 3:
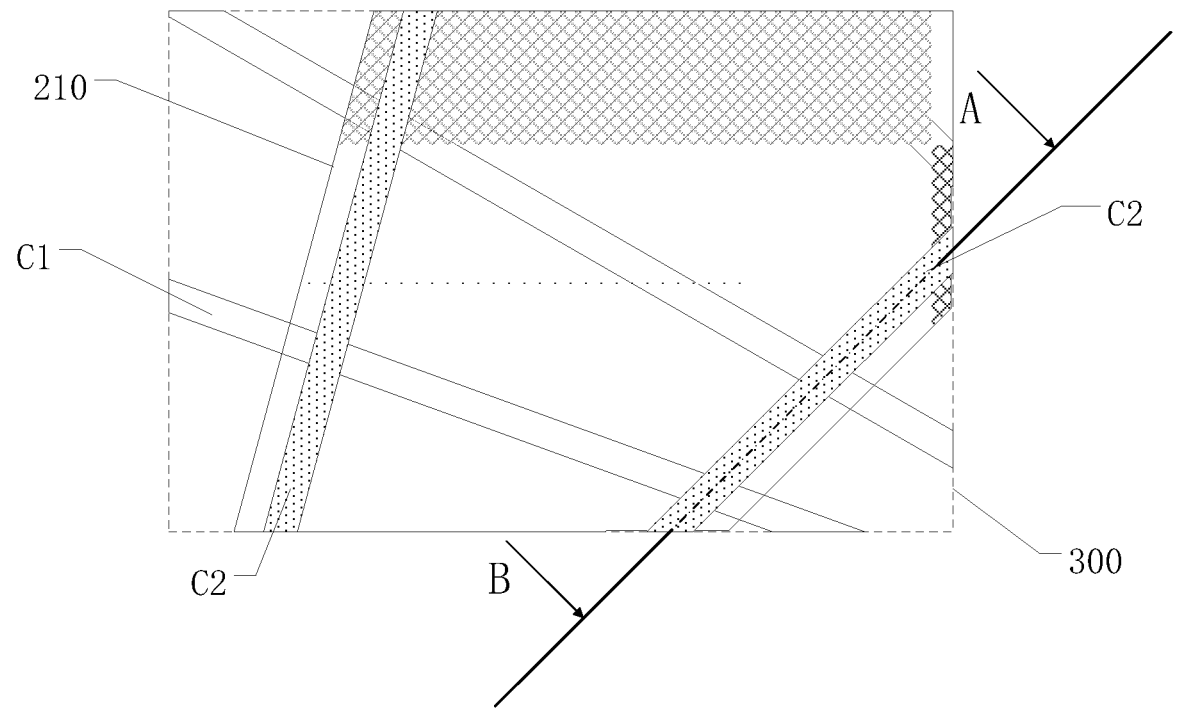
FIG. 3 illustrates a close-up view of a region 300 in FIG. 2.

FIG. 3 illustrates a close-up view of a region 300 in FIG. 2. Referring to FIG. 3, the region 300 may be a part of the overlapping region 400 where the first lead lines C1 and the second lead lines C2 overlap in the direction perpendicular to the substrate 200. In the direction perpendicular to the substrate 200, the second lead lines C2 may be located on the side of the first lead lines C1 facing away from the substrate 200. A conductive layer 210 may be configured on the side of the first lead lines C1 facing away from the substrate 200. The conductive layer 210 may be insulated from the first lead lines C1. The conductive layer 210 may be electrically connected to the second lead lines C2.

Figure 4:
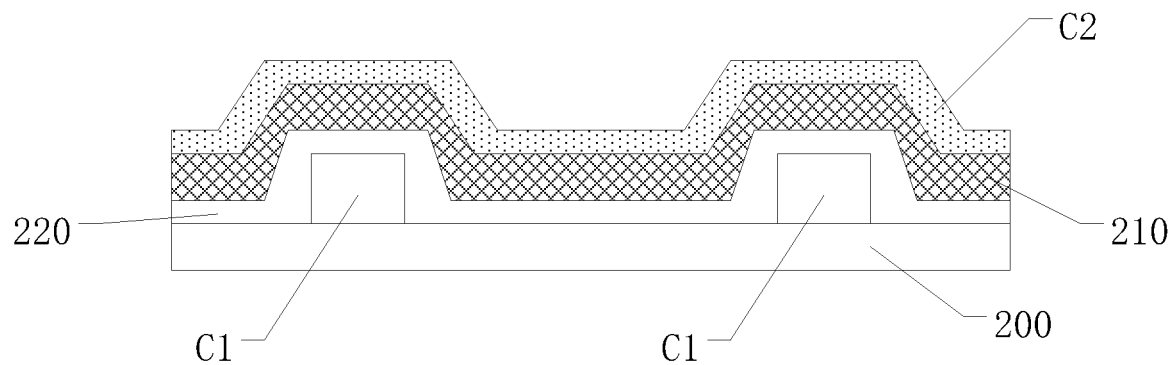
FIG. 4 illustrates a cross-sectional view along the AB line in FIG. 3.

FIG. 4 illustrates a cross-sectional view along the AB line in FIG. 3. Referring to FIG. 4, in the direction perpendicular to the substrate 200, the first lead lines C1 and the second lead lines C2 may overlap in the overlapping region. The second lead lines C2 may be located on the side of the first lead lines C1 facing away from the substrate 200. From the perspective shown in FIG. 4, in the direction perpendicular to the substrate 200, the first lead lines C1 may be configured on the substrate 200. The second lead lines C2 may be configured on the first lead lines C1. A conductive layer 210 may also be configured on the side of the first lead lines C1 facing away from the substrate 200. The conductive layer 210 may be insulated from the first lead lines C1 and may be electrically connected to the second lead lines C2.

As shown in FIG. 4, the conductive layer 210 may be configured between the first lead lines C1 and second lead lines C2. In addition, a first insulating layer 220 may be configured between the conductive layer 210 and the first lead lines C1 to insulate the conductive layer 210 from the first lead lines C1. The second lead lines C2 may be configured directly on the conductive layer 210 so that the conductive layer 210 and the second lead lines C2 may be electrically connected.

In certain other embodiments, the conductive layer 210 may be configured on the second lead lines C2. Further, a second insulating layer (not shown) may be configured between the conductive layer and the second lead lines C2. In this case, the conductive layer 210 may be electrically connected to the second lead lines C2 through through-holes in the second insulating layer.

Accordingly, in the integrated touch control display panel according to the present disclosure, the display structure and the touch control structure may be configured on a same substrate. As a result, the lead lines of the data lines and the lead lines of the touch control signal lines may overlap with one another in the direction perpendicular to the substrate outside the display region. The lead lines of the data lines configured on the substrate may make the substrate surface uneven to cause incidental disconnections when the lead lines of the touch control signal lines overlap with the lead lines of the data lines. When the lead lines of the touch control signal lines are electrically connected to the conductive layer in the overlapping region, even if the lead lines of the touch control signal lines disconnect, the conductive layer may provide connection bridges across the disconnections to maintain the conductivity of the lead lines of the touch control signal lines.

Further, in the case that the conductive layer is configured between the first lead lines and the second lead lines, the conductive layer may smoothen the uneven substrate surface to reduce the disconnection probability of the lead lines of the touch control signal lines to a certain degree. Thus, the conductive layer configured in the overlapping region may improve the reliability of the integrated touch control display panel.

Further, referring to FIG. 2, a plurality of slits may be configured between adjacent stripe-shaped touch control electrodes TPE to completely separate the stripe-shaped touch control electrodes TPE. As a result, each stripe-shaped touch control electrode TPE may be insulated from one another. At the same time, each stripe-shaped touch control electrode TPE may be connected to a touch control signal line TPL to carry the touch control signals.

In one embodiment, each mutually insulated stripe-shaped touch control electrode TPE may independently connect to one touch control signal line TPL to transfer the touch control signals. The touch control signal lines TPL may be insulated from one another. Thus, in this case, the conductive layer may include a plurality of conductive lines that are one-to-one mapping with the individual second lead line C2. The second lead lines C2 may be configured directly on the conductive layer. The conductive lines may have a width greater than the width of the second lead lines C2.

Figure 5:
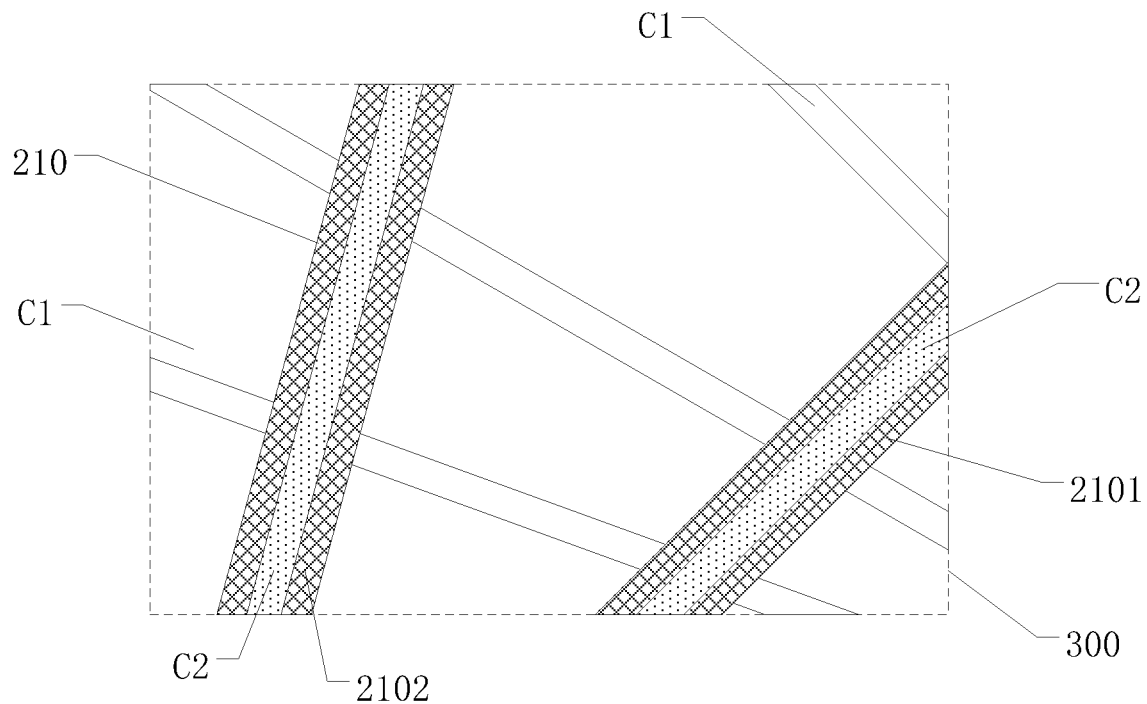
FIG. 5 illustrates a close-up view of another region 300 in FIG. 2.

FIG. 5 illustrates a close-up view of another region 300 in FIG. 2. Referring to FIG. 5, the conductive layer may include a conductive line 2101 and a conductive line 2102. The conductive line 2101 and the conductive line 2102 may correspond to an individual second lead line C2, and may have a width greater than the width of the second lead lines C2. As shown in FIG. 4, the conductive line 2101 and the conductive line 2102 may be configured directly on the corresponding second lead lines C2.

As shown in FIG. 5, each second lead line C2 may operate independently. Subsequently, each stripe-shaped touch control electrode may operate independently. At the same time, the wider width of the conductive lines may reduce the disconnection probability of the conductive lines. Further, the direct contact between the conductive lines and the second lead lines may maximize the contact area between the conductive lines and the second lead lines for the desired electrical connectivity. Thus, the reliability may be further improved.

In another embodiment, referring to FIG. 3, the conductive layer may provide another function. Under certain circumstance, a plurality of mutually insulated stripe-shaped touch control electrodes may carry identical touch control signals synchronously. In other words, the plurality of the mutually insulated stripe-shaped touch control electrodes may be combined and used as one touch control electrode group. The second lead lines that correspond to the plurality of the touch control lines carrying the touch control signals for the touch control electrode group may be electrically connected to one another. Such electrical connectivity may be achieved by connecting the second lead lines through the conductive layer. Alternatively, the electrical connectivity between the second lead lines provided by the conductive layer may be a secondary connectivity for the electrical connectivity between the stripe-shaped touch control electrodes of the touch control electrode group. The electrical connectivity between the stripe-shaped touch control electrodes of the touch control electrode group may have other primary connectivity.

In another embodiment, referring to FIG. 3, the conductive layer may provide another function. Under certain circumstances, one stripe-shaped touch control electrode may be connected to a plurality of touch control signal lines. The second lead lines corresponding to the plurality of the touch control signal lines may be electrically connected to one another through the conductive layer.

Connecting one stripe-shaped touch control electrode to the plurality of the touch control signal lines may substantially reduce the transmission resistance and transmission delay of the touch control signals. In this case, the plurality of the touch control signal lines may be electrically connected to one another. Such electrical connectivity may be achieved by connecting the second lead lines corresponding to the touch control signal lines through the conductive layer. Alternatively, the electrical connectivity between the second lead lines provided by the conductive layer may be a secondary connectivity for the electrical connectivity between the plurality of the touch control signal lines. The electrical connectivity between the stripe-shaped touch control electrodes of the combined touch control electrode may have other primary connectivity.

As shown in FIG. 4, the conductive layer 210 may be configured directly on the second lead lines C2 to maximize the contact area between the conductive lines and the second lead lines C2 to achieve the desired electrical connectivity. To further improve the reliability, in certain embodiments, the conductive layer 210 may be configured between the first lead lines C1 and the second lead lines C2. In certain other embodiments, different configuration may be used.

Figure 6:
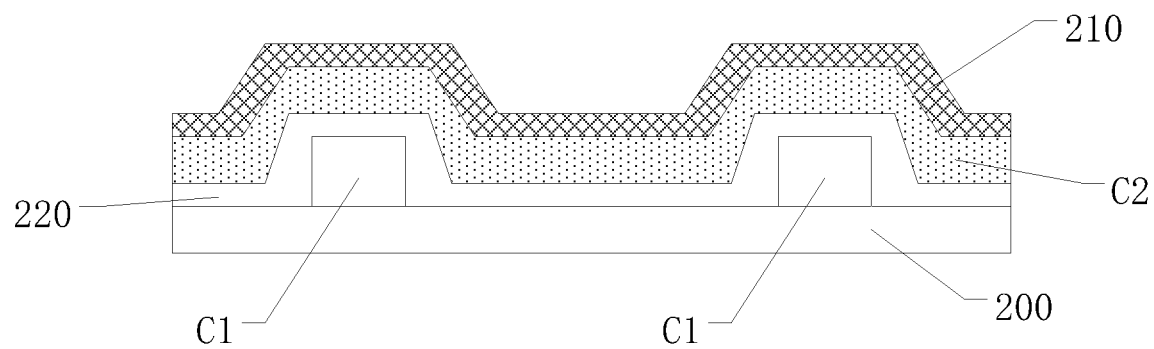
FIG. 6 illustrates another cross-sectional view along the AB line in FIG. 3.

FIG. 6 illustrates another cross-sectional view along the AB line in FIG. 3. Referring to FIG. 6, the conductive layer 210 may be configured on the side of the second lead lines C2 facing away from the substrate 200. From the perspective shown in FIG. 6, the conductive layer 210 may be configured above the second lead lines C2.

The integrated touch control display panel according to the present disclosure may be a liquid crystal display panel. Referring to FIG. 2, the integrated touch control display panel 100 may include a plurality of display pixels PL. Each display pixel PL may include a pixel electrode, a common electrode, and a thin film transistor. The pixel electrode may be electrically connected to a drain electrode of the thin film transistor. A source electrode of the thin film transistor may be electrically connected to a data line DL. A gate electrode of the thin film transistor may be electrically connected to a scanning line SL.

The scanning line SL may supply scanning signals produced by a scanning driver circuit 500 to control the on/off state of the thin film transistor. Subsequently, the scanning line SL may control whether the display signal carried by the data line DL is transmitted to the display pixel. The pixel electrode may receive the display signal. The common electrode may receive the common signal. The pixel electrode and the common electrode in the display pixel may form an electric field to control the rotation of the liquid crystals to display images.

Generally, the common electrode in each display pixel may receive a same common signal. Thus, the common electrodes in the display pixels of the entire display panel may be electrically connected together. The integrated touch control display panel according to the present disclosure may include a common electrode layer. The common electrode layer may include a plurality of sub-electrodes that are insulated from one another. The sub-electrodes may be obtained by dividing the common electrode layer. One sub-electrode may operate as a common electrode for a plurality of display pixels. At the same time, the sub-electrodes may operate as the touch control electrodes.

When the sub-electrodes operate as the touch control electrodes, the integrated touch control display panel may operate in a display phase or a touch control phase. The display phase and the touch control phase may be time multiplexed. Specifically, the default operation phase for the integrated touch control display panel may be the display phase. During the display phase, the sub-electrodes may be supplied with the common signals or may be connected to ground. During the touch control phase, displaying may be suspended, and the sub-electrodes may carry the touch control signals through the touch control signal lines.

Because the sub-electrodes may be multiplexed as the touch control electrodes, it may simplify the fabrication process of the integrated touch control display panel, and may save the manufacturing time and manufacturing cost. Further, when the touch control electrodes are configured separately in the integrated touch control display panel, additional insulating layers may be needed to prevent the touch control electrodes from being interfered by other structures. Thus, the sub-electrodes' operating as the touch control electrodes may simplify the layering structure of the integrated touch control display panel and may reduce the thickness of the integrated touch control display panel.

The integrated touch control display panel according to the present disclosure may have a mutual capacitance touch control structure or a self capacitance touch control structure. The sub-electrodes may have various configurations accordingly. Referring to FIG. 2, in a first configuration, the common electrode layer may include a plurality of first stripe-shaped sub-electrodes TPE. The first stripe-shaped sub-electrodes TPE may operate as the touch control electrodes TPE. Thus, the first stripe-shaped sub-electrodes TPE and the touch control electrodes TPE may be the same. The first stripe-shaped sub-electrodes TPE may extend in a same direction as the data lines DL extend. The plurality of the first stripe-shaped sub-electrodes TPE may be sequentially arranged in a direction intersecting the extension direction of the data lines DL.

Specifically, the first stripe-shaped sub-electrodes TPE may extend in a direction Y. The data lines DL may also extend in the direction Y. The plurality of the first stripe-shaped sub-electrodes TPE may be sequentially arranged in a direction X. The direction X may intersect with the direction Y. As shown in FIG. 2, one first stripe-shaped sub-electrode TPE may be configured to support a plurality of display pixels PL. Consequently, one such first stripe-shaped sub-electrode TPE may be used as a common electrode for the plurality of display pixels PL.

In the first configuration, the first stripe-shaped sub-electrodes TPE may operate as either the touch control driving electrodes or the touch control detecting electrodes in the mutual capacitance touch control structure. In the mutual capacitance touch control structure, the touch control driving electrodes may be supplied with the pulsed touch control driving signals. Capacitors may be formed between the touch control driving electrode and the touch control detecting electrodes. When a touch control event occurs on the integrated touch control display panel, the coupling between the touch control driving electrode and the touch control detecting electrode near the touch position may be affected such that the capacitance between the touch control driving electrode and the touch control detecting electrode near the touch position may be changed.

The touch position may be detected as described in the following. The touch control driving signals may be sequentially supplied to the touch control driving electrodes. At the same time, the touch control detecting electrodes may collect and transmit the touch control detecting signals. Thus, the capacitance values at the intersections of the touch control driving electrodes and the touch control detecting electrodes may be obtained to form the two-dimensional capacitance distribution data for the entire integrated touch control display panel. Based on the two-directional capacitance distribution data for the integrated touch control display panel, the coordinates of the touch position may be calculated.

Figure 7:
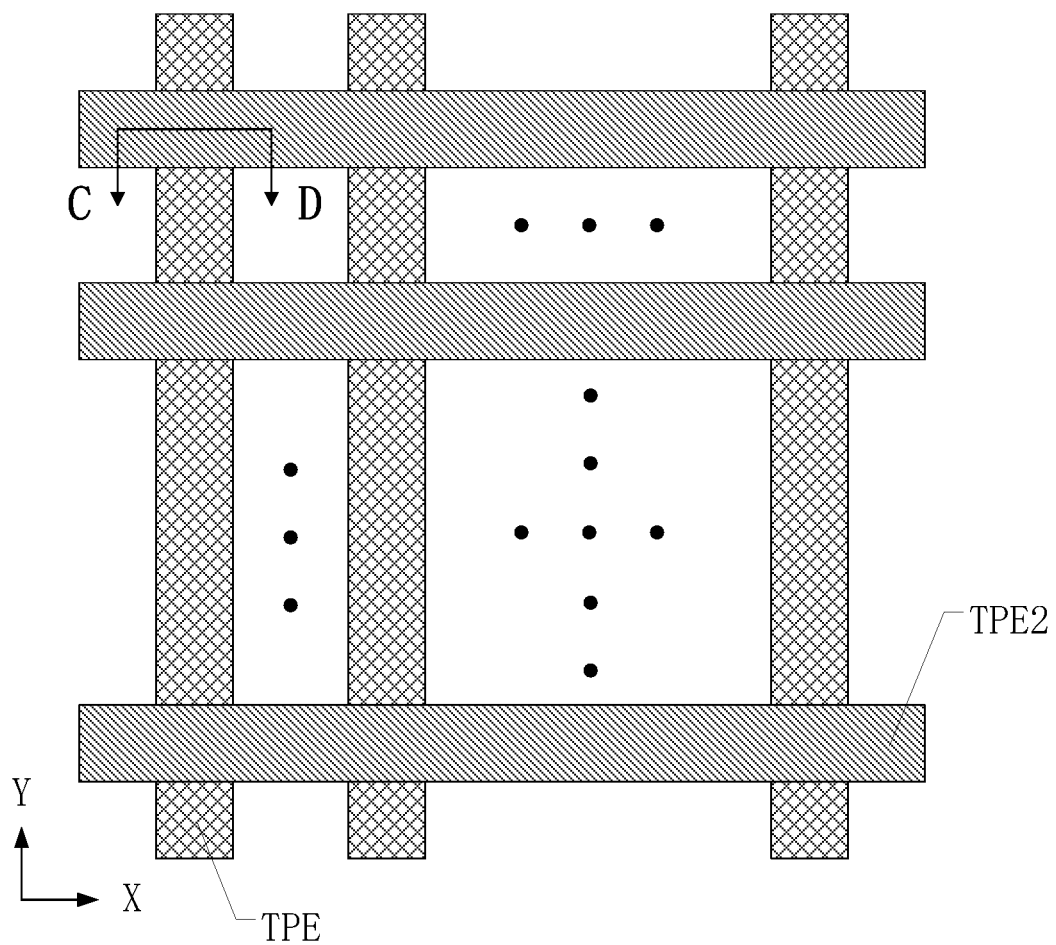
FIG. 7 illustrates a schematic view of an exemplary mutual capacitance touch control structure according to the disclosed embodiments.

FIG. 7 illustrates a schematic view of an exemplary mutual capacitance touch control structure according to the present disclosure. Referring to FIG. 7, the first stripe-shaped sub-electrodes TPE may operate as the touch control driving electrodes. During the touch control phase, the touch control signal lines may supply the touch control driving signals to the first stripe-shaped sub-electrodes TPE. Accordingly, the integrated touch control display panel may also include a plurality of second stripe-shaped sub-electrodes TPE2. The plurality of the second stripe-shaped sub-electrodes TPE2 may be sequentially arranged in parallel. The second stripe-shaped sub-electrodes TPE2 may be used to carry the touch control detecting signals. That is, the second stripe-shaped sub-electrodes TPE2 may operate as the touch control detecting electrodes.

The second stripe-shaped sub-electrodes TPE2 may extend in a direction that intersects with the extension direction of the first stripe-shaped sub-electrodes TPE. Specifically, as shown in FIG. 7, the first stripe-shaped sub-electrodes TPE may extend in the direction Y. The second stripe-shaped sub-electrodes TPE2 may extend in the direction X. The plurality of the second stripe-shaped sub-electrodes TPE2 may be sequentially arranged in parallel in the direction Y. The direction X may intersect with the direction Y. The direction X and the direction Y may be perpendicular to each other, or the direction X and the direction Y may not be perpendicular to each other as long as the direction X intersects with the direction Y.

Figure 8:
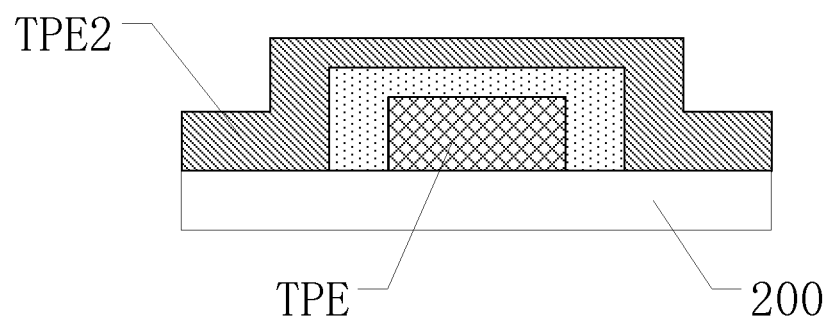
FIG. 8 illustrates a cross-sectional view along the CD line in FIG. 7.

Further, other configurations of the first stripe-shaped sub-electrodes TPE and the second stripe-shaped sub-electrodes TPE2 may be used. FIG. 8 illustrates a cross-sectional view along the CD line in FIG. 7. Referring to FIG. 8, the first stripe-shaped sub-electrodes TPE and the second stripe-shaped sub-electrodes TPE2 may be configured on the substrate 200. The first stripe-shaped sub-electrodes TPE may be configured between the substrate 200 and the second stripe-shaped sub-electrodes TPE2. An insulating layer may be configured between the first stripe-shaped sub-electrodes TPE and the second stripe-shaped sub-electrodes TPE2 to insulate between the first stripe-shaped sub-electrodes TPE and the second stripe-shaped sub-electrodes TPE2.

Figure 9:
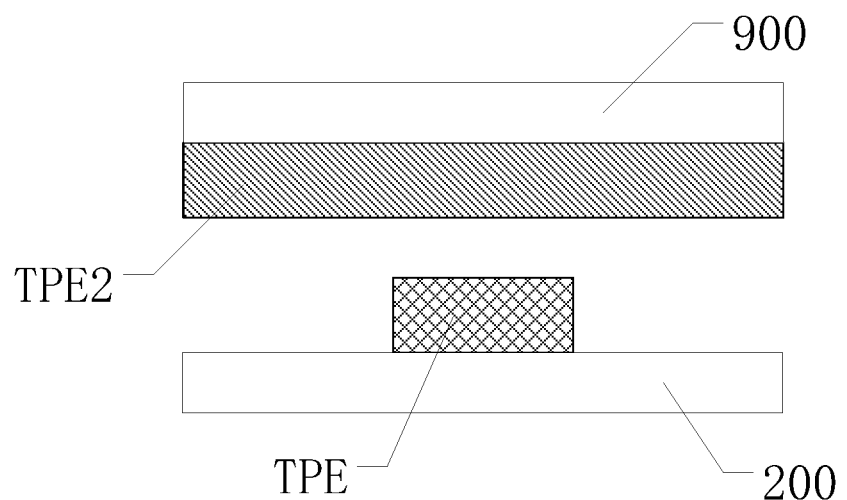
FIG. 9 illustrates another cross-sectional view along the CD line in FIG. 7.

FIG. 9 illustrates another cross-sectional view along the CD line in FIG. 7. Referring to FIG. 9, the first stripe-shaped sub-electrodes TPE may be configured on a first substrate 200. The integrated touch control display panel may also include a second substrate 900 configured facing toward the first substrate 200. The second stripe-shaped sub-electrodes TPE2 may be configured on the second substrate 900. The first stripe-shaped sub-electrodes TPE may be configured on the side of the first substrate 200 facing toward the second substrate 900. The second stripe-shaped sub-electrodes TPE2 may be configured on the side of the second substrate 900 facing toward the first substrate 200. A liquid crystal layer may be configured between the first substrate 200 and the second substrate 900.

Figure 10:
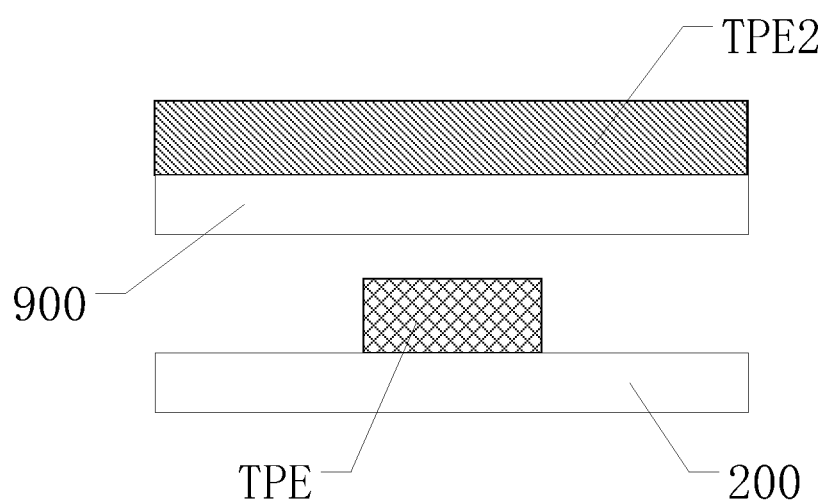
FIG. 10 illustrates another cross-sectional view along the CD line in FIG. 7.

FIG. 10 illustrates another cross-sectional view along the CD line in FIG. 7. Referring to FIG. 10, the first stripe-shaped sub-electrodes TPE may be configured on a first substrate 200. The integrated touch control display panel may also include a second substrate 900 configured facing toward the first substrate 200. The second stripe-shaped sub-electrodes TPE2 may be configured on the second substrate 900. The first stripe-shaped sub-electrodes TPE may be configured on the side of the first substrate 200 facing toward the second substrate 900. Different from the configuration shown in FIG. 9, the second stripe-shaped sub-electrodes TPE2 may be configured on the side of the second substrate 900 facing away from the first substrate 200. A liquid crystal layer may be configured between the first substrate 200 and the second substrate 900.

In certain embodiments, the second stripe-shaped sub-electrodes operate as the touch control detecting electrodes may be configured on the side of the first stripe-shaped sub-electrodes operated as the touch control driving electrodes facing away from the substrate. Touch operations by the user may often be on the side of the first stripe-shaped sub-electrodes facing away from a first substrate. Alternatively, when a second substrate is configured facing toward the first substrate, touch operations by the user may often be on the side of the second substrate facing away from the first substrate.

Therefore, the second stripe-shaped sub-electrodes operated as the touch control detecting electrodes may be configured on the side of the first stripe-shaped sub-electrodes facing away from the first substrate to place the touch control detecting electrodes closer to the touch control operation surface, where the touch control operations may affect the touch control detecting electrodes more substantially. As a result, the touch control detecting electrodes may collect the touch control signals more accurately, and the touch control operations may be performed more precisely.

Preferably, the second stripe-shaped sub-electrodes operated as the touch control detecting electrodes may be configured on the side of the second substrate facing away from the first substrate to allow more precise touch control operations.

Figure 11:
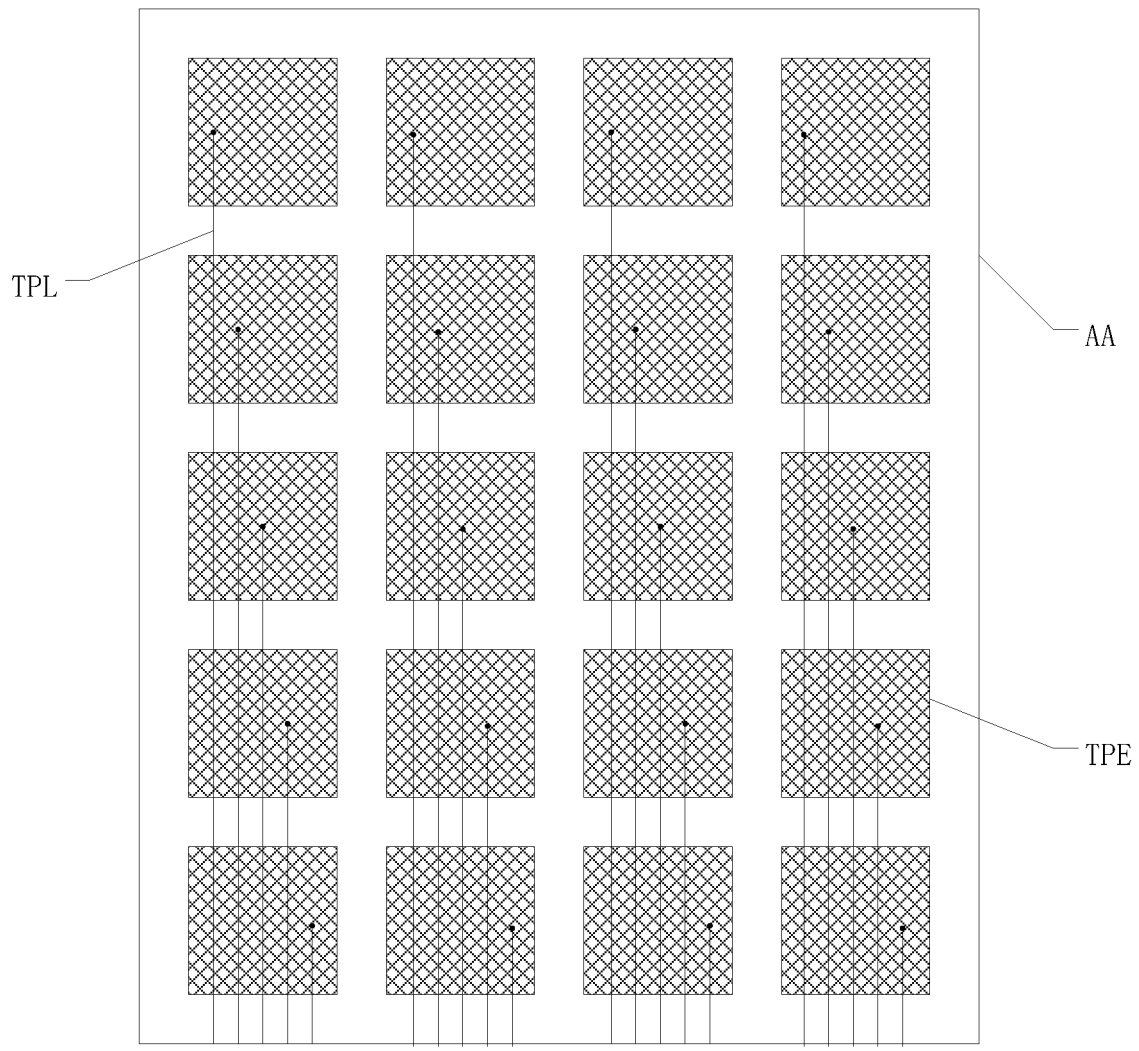
FIG. 11 illustrates a top view of an exemplary self capacitance integrated touch control display panel according to the disclosed embodiments.

In a second configuration, the stripe-shaped sub-electrodes may operate as the self capacitance touch control electrodes. FIG. 11 illustrates a top view of an exemplary self capacitance integrated touch control display panel according to the present disclosure. Referring to FIG. 11, the integrated touch control display panel may include a common electrode layer. The common electrode layer may include a plurality of square-shaped sub-electrodes TPE. The plurality of the square-shaped sub-electrodes TPE may be arranged in an array. The square-shaped sub-electrodes TPE may operate as the self capacitance touch control electrodes.

In the self capacitance touch control structure, the touch control electrodes may be supplied with the touch control driving signals. At the same time, the touch control electrodes may respond with the touch control detecting signals. When a touch control event occurs on the integrated touch control display panel, the capacitance value between the touch control electrode and ground near the touch position may change, and the touch control detecting signal transmitted by the affected touch control electrode may change accordingly. Each touch control electrode may represent an individual point of coordinates. The touch control detecting signals from all available touch control electrodes may be processed to determine the touch position.

As shown in FIG. 11, each touch control electrode TPE may be electrically connected to at least one touch control signal line TPL to ensure that each touch control electrode TPE may independently transmit, through the touch control signal line(s) TPL, the touch control signals which include the touch control driving signal and the touch control detecting signal.

In the integrated touch control display panel according to the present disclosure, the conductive layer may be made of metal or transparent conductive material. The fabrication process of the integrated touch control display panel may include forming a plurality of metal layers and a plurality of transparent conductive layers. Thus, the conductive layer may be formed at the same time with any metal layer or any transparent conductive layer.

Specifically, when the common electrode layer operates as the touch control electrodes, the common electrode layer may need to connect to the touch control signal lines. Consequently, the common electrode layer and the touch control signal line layer may be designed in such way that it may be more easily to connect the common electrode layer with the touch control signal line layer. For example, the second lead lines may often be formed coplanar with the touch control signal lines. The conductive layer may be formed coplanar with the common electrode layer to make the second lead lines more easily connect to the conductive layer.

Figure 12:
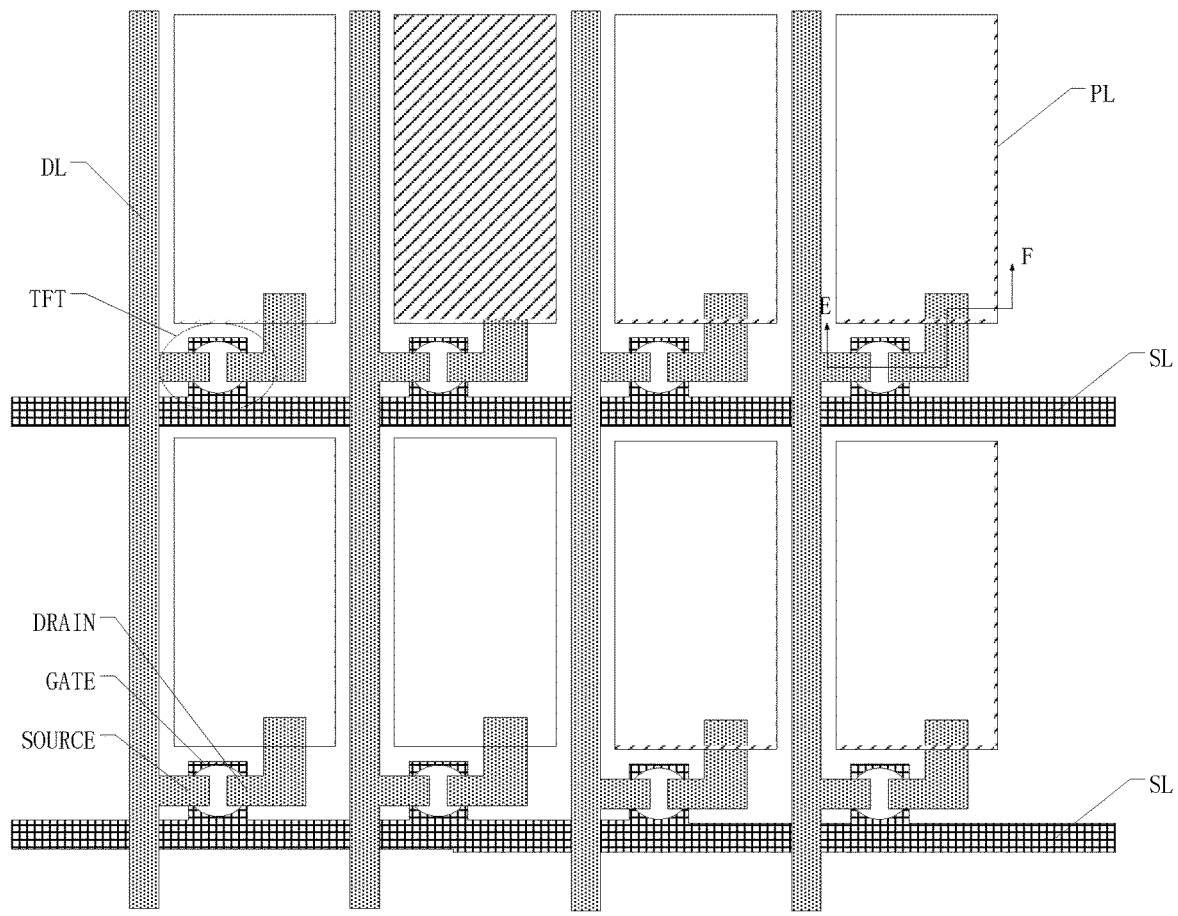
FIG. 12 illustrates a schematic view of a display region of an exemplary integrated touch control display panel according to the disclosed embodiments.

FIG. 12 illustrates a schematic view of a display region of an exemplary integrated touch control display panel according to the present disclosure. Referring to FIG. 12, a display region of the integrated touch control display panel may include a plurality of scanning lines SL, data lines DL, display pixels PL, and thin film transistors TFT. The source electrode SOURCE of the thin film transistor TFT may electrically connected to a data line DL. The drain electrode DRAIN of the thin film transistor TFT may be electrically connected to a display pixel PL. The gate electrode GATE of the thin film transistor TFT may be electrically connected to a scanning line SL.

The scanning signals produced by the scanning driver circuit may be supplied to the scanning lines SL to control the on/off state of the thin film transistors. As such, the scanning lines SL may control whether the display signals carried by the data lines DL may enter the display pixels PL.

The source electrode SOURCE and the drain electrodes DRAIN of the thin film transistors TFT and the data lines DL may be formed at the same time by etching the source/drain electrode metal layer. The gate electrode GATE of the thin film transistors and the scanning lines may be formed at the same time by etching the gate electrode metal layer. Because the data lines DL and the scanning lines SL may intersect with one another on the substrate and may be insulated from one another, the source/drain electrode metal layer and the gate electrode metal layer may not be coplanar.

Figure 13:
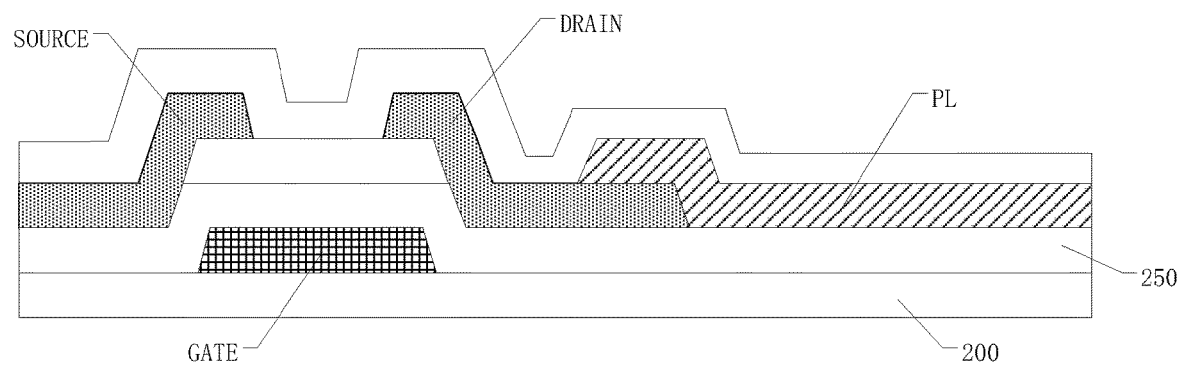
FIG. 13 illustrates a cross-sectional view along the EF line in FIG. 12.

FIG. 13 illustrates a cross-sectional view along the EF line in FIG. 12. Referring to FIG. 13, the gate electrode GATE may be formed on the substrate 200. The source electrode SOURCE and the drain electrode DRAIN may be configured on the gate electrode GATE. An insulating layer 250 may be formed between the source/drain electrodes SOURCE and DRAIN and the gate electrode GATE.

Generally, in the integrated touch control display panel, the number of data lines and the number of display pixels in a row may be equal. For the integrated touch control display panel with high resolution, the number of data lines may be large. Each data line may be connected to at least one first lead line. Therefore, the number of first lead lines may be large as well. The distances between the first lead lines may be small. The integrated touch control display panel according to the present disclosure may use two metal layer to from the first lead lines.

Figure 14:
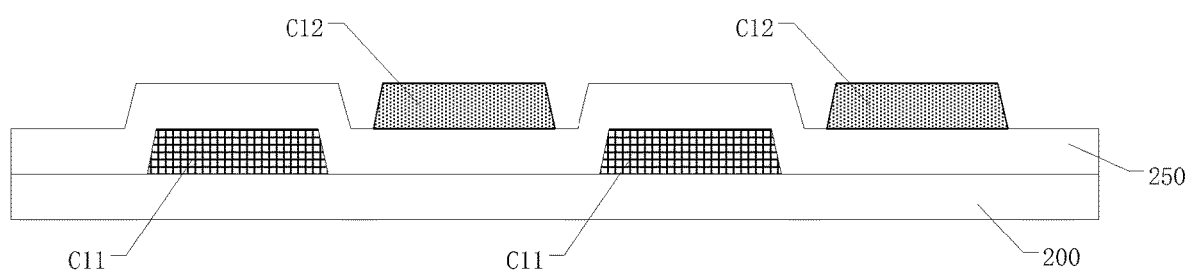
FIG. 14 illustrates a schematic view of a first lead line region of an exemplary integrated touch control display panel according to the disclosed embodiments.

FIG. 14 illustrates a schematic view of a first lead line region of an exemplary integrated touch control display panel according to the present disclosure. Referring to FIG. 14, the first lead lines may include a plurality of gate electrode layer lead lines C11 and a plurality of source/drain electrode layer lead lines C12. The gate electrode layer lead lines C11 may be formed at the same time with the gate electrodes by etching the gate electrode metal layer. The source/drain electrode layer lead lines C12 may be formed at the same time with the source/drain electrodes by etching the source/drain electrode metal layer. The gate electrode layer lead lines C11 and the source/drain electrode layer lead lines C12 may be insulated by an insulating layer 250. The gate electrode layer lead lines C11 and the source/drain electrode layer lead lines C12 may be arranged sequentially and alternately.

Due to the fabrication process constraints, two adjacent lead lines that are formed in a same step of the fabrication process may require a minimum separation distance in between, which may prevent high density configuration of the lead lines, and may enlarge the lead line region. The first lead lines may be divided into the gate electrode layer lead lines and the source/drain electrode layer lead lines. The gate electrode layer lead lines and the source/drain electrode lead lines may be arranged sequentially and alternately.

Adjacent gate electrode layer lead line and source/drain electrode layer lead line may be very close to each other or may overlap with each other in a direction perpendicular to the substrate. Thus, the first lead lines may be densely configured. Further, the gate electrode layer lead lines and the source/drain electrode layer lead lines may be formed in the metal layers excluding the gate electrode metal layer and the source/drain electrode metal layer. As long as the gate electrode layer lead lines and the source/drain electrode layer lead lines are not formed coplanar with each other, the first lead lines maybe densely configured.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An integrated touch control display panel, comprising:
    a first substrate;
    a plurality of data lines configured on the first substrate, supplying display signals to display pixels;
    a plurality of touch control signal lines configured on the first substrate, carrying touch control signals for touch control electrodes;
    a plurality of first lead lines for the data lines configured outside a display region on the first substrate;
    a plurality of second lead lines for the touch control signal lines configured outside the display region on the first substrate; and
    a conductive layer configured adjacent to the second lead lines,
    wherein:
        in a direction perpendicular to the first substrate, the first lead lines overlap with the second lead lines in an overlapping region,
        the second lead lines are configured on a side of the first lead lines facing away from the first substrate, and
        the conductive layer is insulated from the first lead lines and is electrically connected to the second lead lines,
        wherein the integrated touch control display panel satisfies one of the following: the conductive layer includes a plurality of conductive lines which are one-to-one mapping with the plurality of second lead lines, and a conductive line has a width wider than a mapped second lead line; and
        the second lead lines, which correspond to the touch control lines carrying the touch control signals for one touch control electrode group or one touch control electrode, are electrically connected to one another in the conductive layer.

2. The integrated touch control display panel of claim 1, further including a common electrode layer, wherein:
    the common electrode layer includes a plurality of sub-electrodes insulated from one another;
    during a display phase, the sub-electrodes operate as common electrodes; and
    during a touch control phase, the sub-electrodes operate as touch control electrodes.

3. The integrated touch control display panel of claim 2, wherein:
    the common electrode layer includes a plurality of first stripe-shaped sub-electrodes;
    the first stripe-shaped sub-electrodes extend in a same extension direction as the data lines; and
    the first stripe-shaped sub-electrodes are sequentially arranged in a direction intersecting with the extension direction of the data lines.

4. The integrated touch control display panel of claim 3, wherein:
    the touch control signal lines supply touch control driving signals to the first stripe-shaped sub-electrodes.

5. The integrated touch control display panel of claim 4, further including:
    a second substrate configured facing toward the first substrate; and
    a plurality of second stripe-shaped sub-electrodes configured on the second substrate, wherein:
        the second stripe-shaped sub-electrodes carry touch control detecting signals;
        the second stripe-shaped sub-electrodes are sequentially arranged in parallel; and
        the second stripe-shaped sub-electrodes extend in a direction intersecting the extension direction of the first stripe-shaped sub-electrodes.

6. The integrated touch control display panel of claim 2, wherein:
    the common electrode layer includes a plurality of square-shaped sub-electrodes; and
    the square-shaped sub-electrodes are arranged in an array.

7. The integrated touch control display panel of claim 6, wherein:
    during the touch control phase, the square-shaped sub-electrodes operate as self capacitance touch control electrodes.

8. The integrated touch control display panel of claim 2, wherein:
    the conductive layer is formed coplanar with the common electrode layer.

9. The integrated touch control display panel of claim 1, wherein:
    the second lead line directly overlaps with the mapped conductive line.

10. The integrated touch control display panel of claim 1, wherein:
    a same touch control electrode is electrically connected to a plurality of the touch control signal lines; and
    the touch control signal lines are electrically connected to one another through corresponding second lead lines that are electrically connected to one another in the conductive layer.

11. The integrated touch control display panel of claim 1, wherein:
    the conductive layer is configured directly on a side of the second lead lines facing toward the first substrate.

12. The integrated touch control display panel of claim 1, wherein:
the conductive layer is configured directly on a side of the second lead lines facing away from the first substrate.

13. The integrated touch control display panel of claim 1, wherein:
the first lead lines include gate electrode layer lead lines and source/drain electrode layer lead lines; and
the gate electrode layer lead lines are not coplanar with the source/drain electrode layer lead lines.

14. The integrated touch control display panel of claim 13, further including:
a plurality of scanning lines; and
a plurality of thin film transistors configured on the first substrate, wherein:
the thin film transistors are used to control whether the display signals enter the display pixels;
the thin film transistor includes a gate electrode, a source electrode, and a drain electrode;
the gate electrode is connected to a scanning line, the source electrode is connected to a data line, and the drain electrode is connected to a display pixel;
the gate electrode layer lead lines are formed coplanar with the gate electrodes; and
the source/drain electrode layer lead lines are formed coplanar with the source electrodes and the drain electrodes.

15. The integrated touch control display panel of claim 1, wherein:
the touch control electrode group includes a number of mutually insulated touch control electrodes that carry identical touch control signals synchronously.

16. A touch display device including an integrated touch control display panel, the integrated touch control display panel comprises:
a first substrate;
a plurality of data lines configured on the first substrate, supplying display signals to display pixels;
a plurality of touch control signal lines configured on the first substrate, carrying touch control signals for touch control electrodes,
a plurality of first lead lines for the data lines configured outside a display region on the first substrate;
a plurality of second lead lines for the touch control signal lines configured outside the display region on the first substrate; and
a conductive layer configured adjacent to the second lead lines,
wherein:
in a direction perpendicular to the first substrate, the first lead lines overlap with the second lead lines in an overlapping region,
the second lead lines are configured on a side of the first lead lines facing away from the first substrate, and
the conductive layer is insulated from the first lead lines and is electrically connected to the second lead lines,
wherein the integrated touch control display panel satisfies one of the following:
the conductive layer includes a plurality of conductive lines which are one-to-one mapping with the plurality of second lead lines, and a mapped conductive line has a width wider than a second lead line, and
the second lead lines, which correspond to the touch control lines carrying the touch control signals for one touch control electrode group or one touch control electrode, are electrically connected to one another in the conductive layer.

17. The touch display device of claim 16, wherein:
the touch control electrode group includes a number of mutually insulated touch control electrodes that carry identical touch control signals synchronously.

18. The touch display device of claim 16, wherein:
the second lead line directly overlaps with the mapped conductive line.

\* \* \* \* \*